United States Patent [19]

Wakahara

[11] 3,870,407
[45] Mar. 11, 1975

[54] FILM SPEED CHANGE-OVER DEVICE IN A MOTION PICTURE PROJECTOR

[75] Inventor: Shigeo Wakahara, Yokohama, Japan

[73] Assignee: Nippon Kogaku K.K., Tokyo, Japan

[22] Filed: June 14, 1974

[21] Appl. No.: 479,507

[30] Foreign Application Priority Data
June 20, 1973  Japan.................... 48/73355

[52] U.S. Cl................ 352/194, 352/169, 352/180, 226/62
[51] Int. Cl. ........................................... G03b 1/22
[58] Field of Search .......... 352/180, 169, 194, 196; 226/62, 70, 71, 72

[56] References Cited
UNITED STATES PATENTS
3,536,389  10/1970  Reinsch ......................... 352/194 X
3,637,124  1/1972  Veno ............................. 226/62
3,672,755  6/1972  Radl ............................ 352/194

Primary Examiner—Monroe H. Hayes
Attorney, Agent, or Firm—Shapiro and Shapiro

[57] ABSTRACT

A film speed change-over device in a compact motion picture projector employs a cam which rotates at 1/n times the rotational speed of the shutter shaft and a cam follower which, when positioned in engagement with the cam, controls movement of the film-feeding pawl to provide slow-motion projection. The cam follower is axially movable to second and third positions out of engagement with the cam to provide still and normal projection, respectively.

10 Claims, 9 Drawing Figures

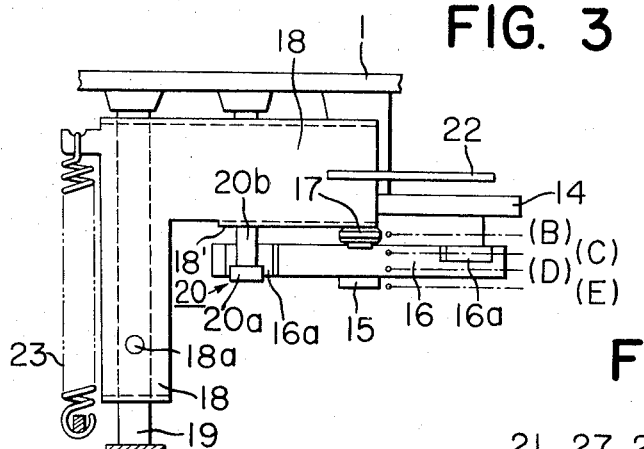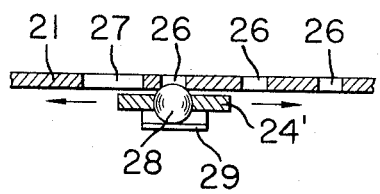

FILM SPEED CHANGE-OVER DEVICE IN A MOTION PICTURE PROJECTOR

BACKGROUND OF THE INVENTION

1. Field of the Invention

This invention relates to a film speed change-over device in a compact motion picture projector.

2. Description of the Prior Art

The film feed mechanisms heretofore employed in compact motion picture projectors include a cam mounted on the shutter shaft for imparting to the film feed pawl a so-called rectangular movement, which is a combination of movement into and out of film perforations and movement in the direction of advance of the film.

With the aid of a cam mounted on a second shaft which rotates at $1/n$ times the speed of rotation of the shutter shaft ($n$ being an integer), the frequency of engagement of the feed pawl with the film may be reduced by a factor of $1/n$ to provide slow motion projection.

It is apparent that multistage change-over of the film speed between still, slow motion and normal projection speeds can be effected by providing a multistage cam on the above-mentioned reduced-speed shaft and by selecting the mode of engagement of such a cam. However, greater reduction in the film speed would require a larger diameter for the multistage cam, and the large number of cam stages would increase the thickness and volume of the cam, thereby increasing the cost of the cam and requiring a larger space for the projector.

SUMMARY OF THE INVENTION

It is a principal object of the present invention to provide an improved film speed change-over device in a compact motion picture projector which enables selection of still, slow-motion and normal projection speeds.

Another object of the invention is to provide an improved film speed change-over device which employs a reduced-speed cam having fewer stages than the number of selectable film speeds.

A film speed change-over device in accordance with the invention for use in a motion picture having a rotatable shutter shaft employs a film-feeding pawl, driving means for moving the film-feeding pawl into a predetermined film-engaging position to engage a perforation in the film and then for moving the film-feeding pawl in the desired direction of film movement to advance the film a single frame, and camming means for rotation at $1/n$ times the speed of rotation of the shutter shaft (n being an integer), the camming means providing a camming surface having a radially recessed portion and a radially projecting portion.

Change-over means includes a cam follower for engaging the camming surface, the cam follower and the camming means being axially movable relative to each other for enabling the cam follower to be moved selectively to a first axial position in engagement with the camming surface, and to second and third axial positions out of engagement with the camming surface. The cam follower in said first axial position has a first radial position when received by said recessed portion of the camming surface and a second radial position when engaging said projecting portion of the camming surface and means are provided for holding the cam follower in said first radial position when the cam follower is in said second axial position and for holding the cam follower in said second radial position when the cam follower is in said third axial position. The change-over means further has means cooperable with the driving means for permitting movement of the film-feeding pawl into said film-engaging position when the cam follower is in one of said first and second radial positions and for preventing movement of the film-feeding pawl into said film-engaging position when the cam follower is in the other of said first and second radial postions.

In the preferred embodiment, the cam follower in said second axial position is off to one side of the camming surface and in said third position is off to the other side of the camming surface. The slow-motion projection speed is determined by the number of recessed portions provided by the camming means, which may comprise a generally circular camming plate having the recessed portions formed in the peripheral surface thereof.

To provide two slow-motion projection speeds, the rotatable camming plate is provided with two axially adjacent camming surface portions which include different numbers of recessed portions, the cam follower being positionable to engage either of the two surface portions. The cam follower may comprise a roller mounted at one end of a pivotable change-over member which is axially movable to position the roller in relation to the camming plate, and the holding means may comprise a stud having first and second different diameter portions for engagement by the change-over member when the cam follower is in the second and third axial positions, respectively. Specially constructed detent means enables single frame feeding of the film.

BRIEF DESCRIPTION OF THE DRAWINGS

FIG. 3 is a plan view similar to FIG. 1, but with certain parts of the device omitted for clarity of description of the operation of the device;

FIG. 4 is a partial cross-sectional view showing the construction of the click stop employed in the device; and FIGS. 5A – 5E graphically illustrate the movements of the feed pawl for different film speeds.

DETAILED DESCRIPTION OF THE PREFERRED EMBODIMENT

Figure 1:
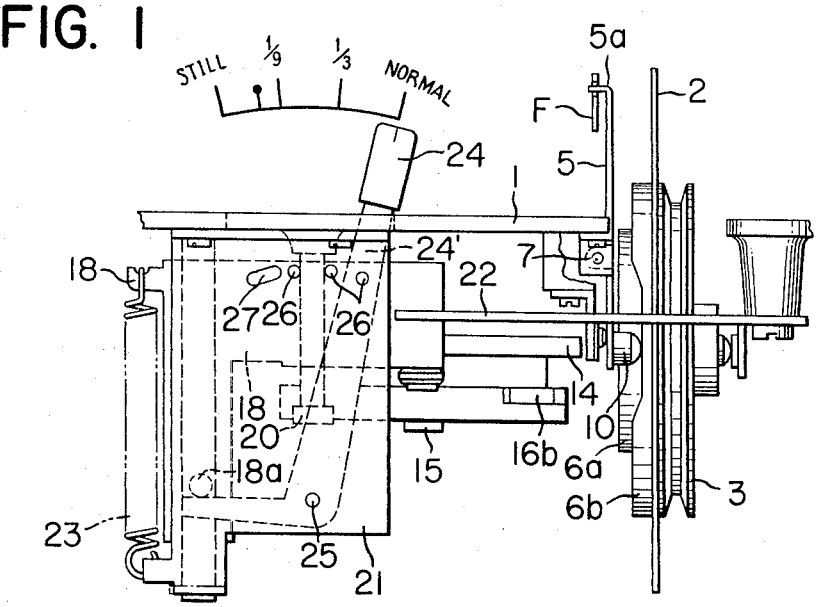
FIG. 1 is a plan view of a film speed change-over device in accordance with the present invention.
Figure 2:
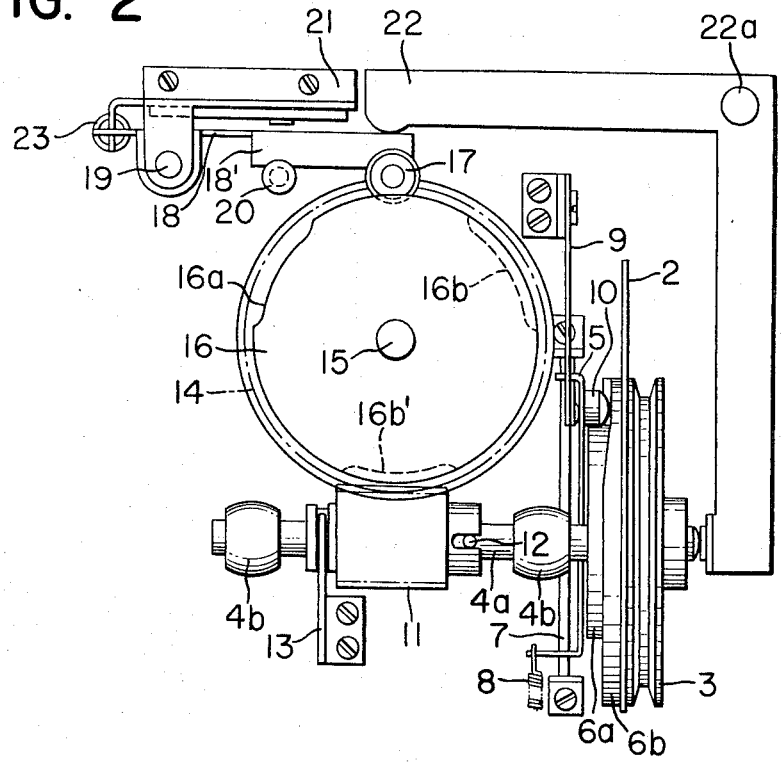
FIG. 2 is a front elevational view of the device.

Referring to FIGS. 1 and 2, reference numeral 1 designates the body of a compact motion picture projector, 2 designates a shutter plate having three openings or apertures therein, and 3 designates a pulley which is rotatable with the shutter plate and which is driven at a speed of 18 rps by a motor (not shown). The shutter plate and the pulley are mounted on a shutter shaft 4a which is supported for rotational and longitudinal movement in bearings 4b. A film-feeding member 5 has a film-feeding pawl 5a formed at one end thereof for moving film F through the projector. A radially-acting cam 6a and an axially-acting cam 6b are formed integrally with each other and mounted on shutter shaft 4a. A guide bar 7 secured to projector body 1 serves to guide movement of the film-feeding member 5 in the film-feeding direction. As shown in FIG. 1, the film-feeding member 5 comprises a lever which is pivotable about the longitudinal axis of guide bar 7 and which has the film-feeding pawl 5a at one end thereof and a stud or pin 10 mounted at the other end thereof.

A spring 8 biases the pin 10 into radial contact with cam 6a, while a leaf spring 9, which has one end secured to the body 1, biases pin 10 into axial contact with cam 6b. Cams 6a and 6b comprise driving means for moving the film-feeding pawl 5a into a predetermined position to engage a perforation of the film and then for moving the film-feeding pawl in the desired direction of film movement to advance the film a single frame for each complete revolution of the shutter shaft. Specifically, cams 6a and 6b cooperate with pin 10 of film-feeding member 5 to effect so-called rectangular movement of the film-feeding pawl, this rectangular movement comprising a combination of vertical movements in the film-feeding direction and in the opposite direction, imparted by cam 6a, and horizontal movements into and out of the film perforations, imparted by cam 6b.

The shutter shaft 4a carries a worm or screw gear 11 which has a slot receiving a pin 12 on the shutter shaft so that the worm is rotatable with the shaft. A restraining member 13 is provided to maintain gear 11 in the position shown in FIG. 2 so that the shutter shaft may be moved longitudinally relative to gear 11. A helical gear 14 mounted on a shaft 15 meshes with gear 11 to rotate the shaft 15 at 1/n times the speed of rotation of the shutter shaft, where n is an integer. In the preferred embodiment, n equals 9 so that the gear 14 rotates at a speed of 2 rps.

A generally circular, radially-acting camming plate 16 is formed integrally with the helical gear 14 on shaft 15. The peripheral surface of the camming plate forms a camming surface having three radially recessed portions 16a, 16b, and 16b' equally spaced around the periphery of the camming plate, as shown in FIG. 2, the recessed portions being separated by radially projecting portions. Recessed portions 16b and 16b' extend substantially halfway across the axial width of the peripheral surface of plate 16, as shown in FIGS. 1 and 3, while recessed portion 16a extends over the entire axial width of the peripheral surface of the plate, as shown in FIGS. 2 and 3. Thus, one portion of the camming surface includes all three recessed portions and the axially adjacent portion of the camming surface includes only recessed portion 16a.

A change-over member 18 has one end slidably and pivotally connected to a shaft 19 carried by a support plate 21 which is mounted to projector body 1. Mounted for rotation at the other end of the change-over member is a roller 17 which can be moved to the axially adjacent positions B, C, D and E of FIG. 3 by axially moving the change-over member. The roller serves as a cam follower for engaging the camming surface portion which includes all three recessed portions when the roller is in position C and for engaging the camming surface portion which includes only recessed portion 16a when the roller is in position D.

A pin or stud 20 provided by the projector body 1 has an end portion 20a of greater diameter than the adjacent portion 20b. When the change-over member 18 is positioned such that roller 17 is in position B of FIG. 3 (i.e., when the roller is axially positioned off to one side of the peripheral surface of camming plate 16), side wall portion 18' of the change-over member engages the smaller diameter portion 20b of pin 20, whereas when the change-over member is positioned such that the roller is in position E of FIG. 3 (i.e., when the roller is axially positioned off to the other side of the peripheral surface of camming plate 16), the side wall 18' engages the larger diameter portion 20a of pin 20.

Referring to FIG. 2, a right-angle link 22 is pivotally supported on a shaft 22a provided by body 1. One end of the link engages the top surface of the end of the change-over member which carries roller 17 and the other end of the link engages the right end of shutter shaft 4a. Leaf spring 9 acts through film-feeding member 5, pin 10, and cam 6b for biasing the shutter shaft rightwardly as viewed in FIG. 2, which biases link 22 for rotation in the counterclockwise direction and biases the change-over member 18 for rotation in the clockwise direction. Roller 17 is thus biased against the peripheral surface of camming plate 16 when the roller is in positions C and D of FIG. 3 and the side wall 18' of the change-over member is thus biased into engagement with portions 20b and 20a of pin 20 when the roller is in positions B and E, respectively, of FIG. 3.

As shown in FIG. 1, a spring 23 has one end hooked into the left end of the change-over member 18 and the other end secured to body 1 so as to normally urge the change-over member in the direction for positioning roller 17 at position E of FIG. 3. A manually operable film speed selection lever 24 is supported for pivotal movement by a pin 25 provided by support plate 21 and is cooperable with pin 18a on the change-over member for moving the change-over member against the force of spring 23 to move the roller to the desired axial position.

Referring to FIG. 4, support plate 21 is formed with a plurality of holes 26 and a slot 27. A steel ball 28 carried in a hole in the shank portion 24' of selection lever 24 is urged against the support plate by a leaf spring 29, the steel ball being receivable by the holes and the slot in the support plate to provide detent means for resiliently maintaining the selection lever and the change-over member in the selected positions against the force of spring 23.

Operation of the film speed change-over device of the invention will now be described. FIG. 5A illustrates diagrammatically the movement of the film-feeding pawl 5a in the direction of film movement (the vertical direction, as viewed in FIG. 2), this movement being imparted by the cooperation of cam 6a and pin 10 regardless of the axial position of roller 17. The abscisa represents time and the shaded sections represent the time interval during which the shutter 2 intercepts the light.

When it is desired to feed the film at the normal rate of one frame per revolution of the shutter 2, lever 24 is moved to NORMAL (FIG. 1) position for moving the change-over member to the position in which roller 17 is in position B of FIG. 3. Side wall 18' of the change-over member is biased into engagement with the smaller diameter portion 20b of pin 20 so that the roller is held in the radial position shown in FIG. 2. For reasons which will be apparent hereinafter, this position corresponds to the radial position which the roller assumes when it is received by one of the recessed portions in the peripheral surface of camming plate 16.

Referring to FIG. 5A, the time period comprising time intervals (i) through (iv) corresponds to one complete revolution of the shutter. More particularly, when the change-over device of the invention is set for NOR- MAL projection speed, (i) represents the time interval during which the film-feed pawl 5a, having been moved into engagement with a perforation of film F, is moved downwardly to advance the film one complete frame, (ii) represents the time interval during which the film-feeding pawl is retracted from the perforation, (iii) represents the time interval during which the film-feeding pawl is returned to its uppermost vertical position, and (iv) represents the time interval during which the film-feeding pawl is moved into engagement with another perforation of the film.

FIG. 5B illustrates diagrammatically the movement of the filmfeeding pawl in the direction perpendicular to the plane of film F (i.e., the horizontal direction, as viewed in FIG. 2) when the change-over device is set for NORMAL projection speed, this movement being imparted by axially-acting cam 6b. Specifically, during the time interval corresponding to (iv) of FIG. 5A, the film-feeding pawl is moved into its leftmost position L to engage a perforation of the film and is maintained in that position during the subsequent interval (i) in which the film-feeding pawl is moved in the desired direction of film movement for advancing the film one frame. The film-feeding pawl is moved to a position near the rightmost position R during interval (ii) to disengage the perforation and is held in that position for the next interval (iii) during which the film-feeding pawl is moved in the direction opposite to the film-feeding direction to be returned to its uppermost vertical position (FIG. 5A).

To project the film at ⅓ the normal speed, the selection lever 24 is moved to the position designated "⅓" (see FIG. 1). Spring 23 then acts on the change-over member to move the roller 17 into position C of FIG. 3 as soon as one of the recessed portions in the peripheral surface of rotating camming plate 16 is aligned to receive the roller. Thereafter, whenever the roller is received by one of the recessed portions, the change-over member and the roller assume the positions shown in FIG. 2 so that the film-feeding pawl can be moved horizontally into the leftmost position L (at the times indicated by the arrows in FIG. 5C) for advancing the film in the manner described above with respect to the operation of the device at the normal projection speed. However, whenever the roller is moved into a radial position in which it engages a projecting portion of the cam (i.e., when it is not received by a recessed portion), the change-over member is caused to rotate slightly counterclockwise from the position shown in FIG. 2. This causes link 22 to be rotated clockwise, which causes the shutter shaft 4a and cam 6b to be moved leftwardly, as viewed in FIGS. 1 and 2.

Referring to FIG. 1, when cam 6b is moved leftwardly from the position shown, it acts against pin 10 on the film-feeding member 5 to pivot the film-feeding pawl 5a away from the surface of the film, thereby preventing cam 6b from being effective to move the film-feeding pawl into the leftmost position L in which it can engage a perforation of the film. Because the cam 16 rotates at 1/9 the speed of rotation of the shutter shaft, the three recessed portions cooperate with roller 17 to cause the film-feeding pawl to feed one frame of film for three complete revolutions of the shutter, as indicated by the arrows in FIG. 5C. Thus, for a shutter speed of 18 rps, the film-feeding speed is six frames per second.

To project film at 1/9 normal speed, the selection lever is moved to the position designated "1/9" (FIG. 1). Spring 23 then acts on the change-over member to move the roller 17 into position D of FIG. 3 as soon as recessed portion 16a receives the roller so that the roller is biased into engagement with the portion of the peripheral surface of cam 16 which includes only recessed portion 16a. When the roller is in this position, the film is fed one frame for every nine revolutions of the shutter, one of the time intervals during which film is advanced being designated by the arrow in FIG. 5D. Thus, for a shutter speed of 18 rps the film-feed rate is two frames per second.

To effect still projection, the selection lever 24 is moved to the position designated STILL in FIG. 1. Spring 23 then acts against the change-over member to move the roller to the position E in FIG. 3, wherein the side wall 18' of the change-over member is biased into engagement with the larger diameter end portion 20a of pin 20, which holds the change-over member and the roller in the positions which they would assume if the roller were engaging one of the projecting portions of camming plate 16. As a result, shutter shaft 4a and cam 6b are maintained in their leftmost positions by link 22 so that horizontal movement of the film-feeding pawl 5a into the film engaging position L is prevented throughout the cycle of rotation of the shutter shaft, as illustrated by FIG. 5E.

The selection lever 24 can also be actuated to feed a single frame of film. After the selection lever has been moved into the STILL position, it can be moved back to a position intermediate the STILL position and the "1/9" position (designated by the black spot in FIG. 1) without opposition by the detent means because the steel ball 28 is received by slot 27 during this motion. Movement of the selection lever to the black spot position causes the roller 17 to be moved to a position intermediate the positions D and E of FIG. 3 for engaging the camming surface portion which includes only recessed portion 16a so that the film can be fed at a rate of two frames per second. Upon confirmation of one frame having been fed, the operator releases the selection lever so that spring 23 can act on the change-over member to return the roller 17 to position E, which causes the selection lever to be returned to the STILL position. Because movement of the selection lever past the black spot position is resiliently opposed by the ball 28, it is impossible for the operator to inadvertently move the selection lever past this black spot position.

It is believed that the advantages and improved results furnished by the film speed change-over device of the invention will be apparent from the foregoing description of a preferred embodiment thereof. Various changes and modifications may be made without departing from the spirit and scope of the invention, as sought to be defined in the following claims.

I claim:

1. A film speed change-over device in a motion picture projector having a rotatable shutter shaft, the device comprising:
   a film-feeding pawl;
   driving means for moving the film-feeding pawl into a predetermined position to engage a perforation in the film and then for moving the film-feeding pawl in the desired direction of film movement to advance the film a single frame;

camming means for rotation at 1/n times the speed of rotation of the shutter shaft, where n is an integer, the camming means providing a camming surface having a radially recessed portion and a radially projecting portion;

change-over means including a cam follower biased to engage said camming surface, the cam follower and the camming means being axially movable relative to each other for enabling the cam follower to be moved selectively to a first axial position in engagement with the camming surface and to second and third axial positions out of engagement with the camming surface, the cam follower in said first axial position having a first radial position when received by said recessed portion of the camming surface and a second radial position when engaging said projecting portion of the camming surface; and holding means for holding the cam follower in substantially said first radial position when the cam follower is in said second axial position and for holding the cam follower in substantially said second radial position when the cam follower is in said third axial position, said change-over means having means cooperable with the driving means for permitting movement of the film-feeding pawl into said predetermined position when the cam follower is in substantially one of said first and second radial positions and for preventing movement of the film-feeding pawl into said predetermined position when the cam follower is in substantially the other of said first and second radial positions.

2. A device as set forth in claim 1, wherein the camming means comprises a generally circular camming plate, and wherein the camming surface comprises substantially the entire axial width of the peripheral surface of the camming plate.

3. A device as set forth in claim 1, wherein the cam follower is mounted on a change-over member, and wherein the change-over member is axially movable relative to the camming plate for selectively positioning the cam follower in relation to the camming surface.

4. A device as set forth in claim 3, further comprising a manually operable selection lever having means cooperable with means provided by the change-over member for axially moving the change-over member to selectively position the cam follower in relation to the camming surface.

5. A device as set forth in claim 1, further comprising detent means for resiliently maintaining the cam follower in the selectable positions.

6. A device as set forth in claim 3, wherein the holding means comprises a stud having a first diameter portion cooperable with means provided by the change-over member for holding the cam follower in said first radial position when the cam follower is in said second axial position and having a second diameter portion cooperable with said means provided by the change-over member for holding the cam follower in said second radial position when the cam follower is in said third axial position.

7. A device as set forth in claim 2, wherein the camming surface includes a plurality of recessed portions equally spaced about the peripheral surface of the camming plate.

8. A device as set forth in claim 7, wherein fewer than all of said plurality of recessed portions extend across substantially the entire axial width of the camming surface for providing a first camming surface portion which includes all of said recessed portions and an adjacent second camming surface portion which includes fewer than all of said recessed portions, and wherein the cam follower is selectively axially movable into engagement with said first and second camming surface portions.

9. A device as set forth in claim 8, further comprising detent means for resiliently maintaining the cam follower in engagement with said first and second camming surface portions and in said second axial position and for permitting unopposed movement of the cam follower between said third axial position and an intermediate position wherein the cam follower engages one of said first and second camming surface portions, and further comprising biasing means for urging the cam follower into said third axial position.

10. A device as set forth in claim 1, wherein said cam follower is off to one side of the camming surface in said second axial position and is off to the other side of the camming surface in said third axial position.

* * * * *